Patented Mar. 12, 1946

2,396,582

UNITED STATES PATENT OFFICE 2,396,582

PREPARATION OF DYESTUFFS OF THE INDANTHRENE SERIES

Hans Z. Lecher, Plainfield, Mario Scalera, Somerville, and Elizabeth M. Hardy, Bound Brook, N. J., assignors to American Cyanamid Company, New York, N. Y., a corporation of Maine No Drawing. Application January 17, 1944, Serial No. 518,586

18 Claims. (Cl. 260—263)

This invention relates to an improved process for producing vat dyestuffs of the indanthrene class containing the ring system:

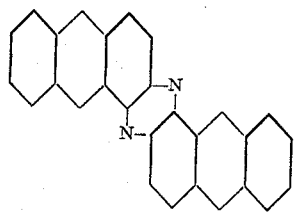

The invention also includes the preparation of sulfuric acid ester salts of the leuco quinones.

Dyestuffs of the indanthrene series have been prepared by converting beta-aminoanthraquinones into their leuco disulfuric acid esters and oxidizing in aqueous medium, thus effecting ring closure. This process has not generally replaced the standard procedure involving an alkaline fusion of beta-aminoanthraquinone. The main reason for the failure lies in the fact that the preparation of the disulfuric acid ester of leuco beta-aminoanthraquinone has presented serious economic problems in the past. The reaction was ordinarily carried out under anhydrous conditions in an organic solvent such as pyridine or dimethyl aniline, using the sulfur trioxide addition products of these bases as the esterifying agents.

According to the present invention the production of indanthrene dyestuffs or their leuco tetra-sulfuric esters by oxidation of the leuco disulfuric esters of beta-aminoanthraquinones is improved and rendered practical commercially by carrying out the first step of the process in aqueous medium utilizing as the esterification agent sulfur trioxide compounds of strongly basic tertiary amines. These compounds are capable of esterifying leuco beta-aminoanthraquinones in aqueous medium and the conversion to the indanthrene dyestuffs may then be directly carried out in the same medium.

The oxidation step may be carried out either in acid medium using for example ferric chloride and hydrochloric acid or in alkaline medium for example with sodium hypochlorite or lead dioxide. The results of these oxidations are not quite the same. The acid process produces a hydrolysis of the ester at the same time that ring closure takes place and only the final indanthrene dyestuff is obtained. In alkaline medium, however, it is possible to isolate the tetra sulfuric ester of the dianthrahydroquinone azine. In either event the first step is carried out in aqueous medium and the present process gives the same advantages regardless of the method of oxidation.

The amino group in the beta-aminoanthraquinone does not have to be free. In fact, in many cases there is considerable advantage in protecting the amino group by acylation, for example with formic, acidic, oxalic, or benzoic acid, or by the use of compounds in which the amino group is part of a urea or urethane. The acylated compounds present the advantage that the amino group does not react with the tertiary amine sulfur trioxide compound during esterification and considerable savings of the esterifying agent may, therefore, be obtained. When the amino group is free it reacts with further amounts of esterifying agent to produce a sulfamic acid group. If an acylated beta-aminoanthrahydroquinone is esterified the protecting acyl group is readily hydrolyzed off after esterification by heating in alkaline solution. When the oxidation is in alkaline medium at higher temperatures, the hydrolysis of the protecting acyl amino group is effected in the same reaction as the oxidation. The sulfamic group is not hydrolyzed as readily and may advantageously be removed during the oxidation by more drastic conditions.

In the esterifying step the amines giving sulfur trioxide compounds operable in our present invention are not limited to any particular class. However, it is necessary for practically useful results that these amines have a dissociation constant of at least $1 \times 10^{-7}$ at 25° C. Examples of such amines are simple tertiary alkyl amines, such as trimethylamine, triethylamine, the tripropylamines, the tributylamines; unsaturated straight chain amines, such as triallylamine; aralkylamines, such as dimethyl benzylamine and diethyl benzylamine; alicyclic amines, such as cyclohexyl dimethylamine, cyclohexyl diethylamine, cyclopentyl dimethylamine; and heterocyclic amines of aliphatic character such as N-methyl morpholine, N-ethyl morpholine, and N-ethyl piperidine.

The sulfur trioxide addition products with which the present invention is concerned are now generally regarded as internal salts of trisubstituted sulfamic acids and are represented by the following formula:

$$\overset{+}{R_3N}-\overset{-}{SO_3}$$

Some of these products are known and others are themselves new compounds. They may be prepared in a number of ways in general known, such as the action of sulfur trioxide or agents capable of generating sulfur trioxide on tertiary bases. They are quite different from the corresponding addition products of aromatic amines such as dimethylaniline or pyridine. They show much greater stability to water from which some of them may be recrystallized and they resist aqueous alkali sufficiently to permit ready reaction with the leuco beta-aminoanthraquinones.

The stability of the strong tertiary amine sulfur trioxide compounds toward hydrolysis is all the more surprising, in view of the fact that they are extremely reactive in aqueous alkaline medium, reacting rapidly with the leuco beta-aminoanthraquinone to form the corresponding disulfuric acid esters. Equally surprising is the fact that the aqueous solution of the sulfuric esters thus obtained should be in a condition suitable for direct conversion to the indanthrenes without intermediate isolation.

The most conspicuous advantage of the present invention is the possibility of conducting such a wide variety of chemical transformations, from beta-aminoanthraquinone to indanthrene, in the same aqueous medium and without isolation. Other advantages also exist.

Thus, the amine which is produced in the first stages of the reaction can be readily recovered. The esterification step of the process is considered to proceed in accordance with the equation:

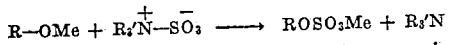

The regenerated amine may be most conveniently recovered at the completion of the esterification by heating the aqueous alkaline liquors.

The process is also flexible with respect to the vatting of the beta-aminoanthraquinones. It is possible to first vat the quinone, and then react the solution of the leuco compound with the sulfur trioxide tertiary amine product; or the amine sulfur trioxide compound may be present during the vatting operation, the two steps occurring side by side.

Another desirable flexibility of the new process is found in the oxidation step. The oxidation may be carried out in acid medium, such as with ferric chloride and hydrochloric acid to give directly the indanthrene dyestuffs; or it may be carried out in alkaline medium, for instance with sodium hypochlorite, ferricyanide, permanganate, lead dioxide, or silver oxide, or by electrolytic oxidation, to form the tetrasulfuric ester of the dianthrahydroquinone azine. It is of interest that the sodium sulfite, formed as a by-product when sodium hydrosulfite is used in the vatting operation, does not interfere with the oxidation step, but may be easily destroyed by the use of sufficient excess of the oxidizing agent employed, or removed by precipitation with a suitable agent such as calcium chloride or barium hydroxide. When zinc and caustic alkalis are used as vatting agents, no sulfite removal problem arises.

The preferred medium for the process of our invention is, of course, water. However, it is not necessary to use water alone, and other solvents which are miscible with the alkaline aqueous solution and are compatible with the other reactants may be added to the aqueous medium. Examples of such solvents are the lower aliphatic alcohols, acetone, pyridine, polyakylene oxides and the like. The mixed solvent may be used in the first steps of vatting and esterification only, and later distilled out with the recovered amine; or it may be used throughout the operation.

The present invention is not limited to the production of unsubstituted indanthrene dyestuffs from unsubstituted beta-aminoanthraquinones although this dyestuff is among the important commercial products which can be made by the present invention. The process is in fact generally applicable to any beta-aminoanthraquinones so long as they contain a free alpha position adjacent to the amino group. Thus, for example, the mono-substituted beta-aminoanthraquinones such as those substituted with chlorine, bromine alkyl groups, for example methyl, ethyl, propyl, etc., alkoxy groups, carboxylic acid, and sulfonic acid groups are all usable in the process of the present invention and its advantages are obtained in each case. The 3-chlor-2-amino-anthraquinone is a particularly important example of a substituted beta-aminoanthraquinone.

It is not intended to limit the present invention to any theory of action and we do not know why any impurities which may be produced in the esterification reaction do not adversely affect the oxidation reaction in the preferred form of the present invention where the esterification reaction mixture is oxidized without any isolation. We have noted, however, no adverse effect in these succeeding steps and the posibility of using the esterification mixture without any isolation represents a valuable practical advantage saving time, equipment and cost and is, therefore, preferred.

The invention will be illustrated in the following specific examples, the parts being by weight.

*Example 1*

265 parts of beta acetylamino anthraquinone are vatted in the conventional manner in 2000 parts of water by means of 231 parts of commercial powdered sodium hydrosulfite and 418 parts of caustic potash (86%). The 586 parts of the N-ethyl morpholine SO₃ compound (prepared by the action of sulfur tri-oxide of N-ethyl morpholine in chloroform; white crystal, M. P. 150° C.) is added, and the mixture agitated for several hours at room temperature under exclusion, of air. The solution is aerated, clarified from small amounts of unchanged beta-acetylamine anthraquinone. The clear orange solution, showing a green fluorescence, contains the disulfuric ester of beta acetylamino anthrahydroquinone of the formula:

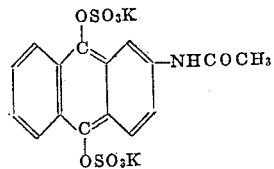

This solution is treated with 1,260 parts of barium hydroxide hydrate crystals and boiled until all of the ethyl morpholine has been distilled out. The mixture is filtered hot, the clear filtrate is treated with 138 parts of potassium carbonate and again filtered to remove the excess of baryta. In these operations, the acetyl group is hydrolyzed off, and the clear solution contains the disulfuric ester of beta aminoanthrahydroquinone, and is free from sulfate and sulfite ions.

This solution is cooled to 15° C., and a solution containing 70 parts of NaOCl is added and agitated for several hours at 10°–20° C.

The resulting liquor contains the alkali salts of the tetrasulfuric ester of dianthrahydroquinone azine, of the formula:

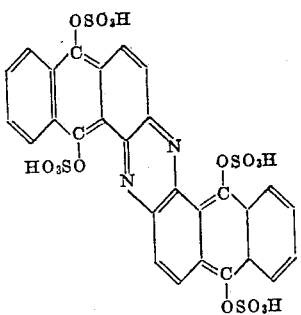

When a sample is diluted, it is orange in color, with intense green fluorescence, and on acidification it turns to deep red violet, with the precipitation of a moderately soluble violet body, probably the disulfuric acid ester of dihydroindanthrone.

The potassium salt of the tetrasulfuric ester formulated above may be isolated by adding $K_2CO_3$ to the liquor until the concentration of K ions is equivalent to 40% $K_2CO_3$. The ester salt is precipitated as a yellow-brown product which may be further purified, if desired, by redissolving in water, filtering, and salting out again with $K_2CO_3$.

Example 2

134 parts of beta aminoanthraquinone, in the form of a finely dispersed press cake, is slurried into water, the volume is made up to 2,500 parts (by volume) and 223 parts of caustic soda and 151 parts of commercial powdered sodium hydrosulfite is added. The slurry is agitated under exclusion of air until vatting is complete, then 527 parts of the N-ethyl morpholine-$SO_3$ compound is added, and agitation is continued at room temperature for some hours longer.

The mixture is aerated and filtered from a small amount of unchanged beta amino anthraquinone. The clear filtrate contains the disulfuric ester of beta amino anthrahydroquinone sulfamic acid of the formula:

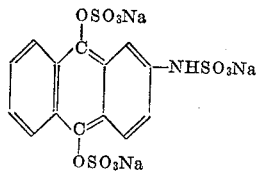

A portion of the solution thus prepared, containing 135 parts of the compound of the above formula, is cooled to 0°-5° C. and treated with a sodium hypochlorite solution containing 54 parts of NaClO, in order to oxidize the sodium sulfite. The solution is agitated for a short time at 5° C., then 128 parts of potassium carbonate and 305 parts of potassium ferricyanide (dissolved in 200 parts of water) are added. The solution is brought to a boil, held at the boiling temperature for a few hours, and filtered.

The clear solution contains the tetrasulfuric ester of dianthrahydroquinone azine, which may be isolated as described in Example 1. On acidification, followed by addition of cupric sulfate (100-150 parts) and boiling, a heavy blue precipitate of indanthrene is obtained, which may be isolated by filtration, and is obtained in a highly pure state by an extraction with hot nitrobenzene.

Example 3

133 parts of beta acetylamino anthraquinone are vatted in the usual manner in 1,200 parts of water with 115 parts of sodium hydrosulfite (commercial) and 128 parts of caustic soda. To the vat are added 293 parts of the N-ethyl morpholine-$SO_3$ addition product, and the slurry is agitated at room temperature for several hours, under exclusion of air. 50 parts of caustic soda is added, and the solution boiled, to hydrolyze the acetyl group and recover the ethyl morpholine. The solution is filtered. It contains the disulfuric ester salt of beta amino anthrahydroquinone.

The sodium sulfite produced in the vatting operation is oxidized by addition of the calculated quantity of sodium hypochlorite solution (80 parts of NaClO) at 0° to 5° C. A solution is then prepared containing 500 parts of ferric sulfate in 1,750 parts of water. These two solutions are added simultaneously and uniformly to 250 parts of 15% sodium sulfate solution maintained at 80° C. The mixture is heated at 85° for a few hours after complete addition.

The blue precipitate of indanthrene is filtered, washed, dried. The dyestuff, which is obtained in good yield, may be purified by revatting or by an extraction with hot nitrobenzene.

Example 4

A solution, containing 172 parts of the disodium salt of beta amino anthrahydroquinone disulfuric ester, and prepared as described in the first paragraph of the preceding example, is made acid with hydrogen chloride, filtered if necessary, and treated gradually at 30-35° C. with 487 parts of ferric chloride dissolved in 2,500 parts of water.

Precipitation of the indanthrene begins almost immediately. The slurry is agitated for some hours after the addition, the dyestuff is isolated by filtration, washed with dilute hydrochloric acid and finally with water.

Example 5

A solution, containing 86 parts of the disodium salt of beta amino anthrahydroquinone disulfuric ester and 2,000 parts of water, is prepared as described in the first paragraph of Example 3. This solution is heated to 95°, and thereto is added first 480 parts of 30% caustic soda solution, and then, gradually, 1,300 parts of 30% silver nitrate solution. After maintaining at 95-100° C. for a few hours, the mixture is filtered.

The filtrate contains the tetrasulfuric ester of dianthrahydroquinone azine, which may be separated as its potassium salt as described in Example 1, or may be converted to the free dyestuff by treatment with acid cupric sulfate.

Example 6

210 parts of 2-acetylamino-3-chloro anthraquinone are slurried in a solution of 2000 parts of water and 300 parts of caustic potash (85%). 162 parts of sodium hydrosulfite powder (90%) is added, and the resulting red solution agitated at room temperature until vatting is complete, preferably under exclusion of air.

410 parts of the N-ethyl morpholine-sulfur trioxide compound is added and agitation continued at room temperature for several hours. The solution is treated with a stream of air for a short period of time, and clarified. The resulting liquor is yellow brown in color, and exhibits a bluish fluorescence in high dilution. It contains the disulfuric acid ester of 3-chloro-2-acetylamino anthrahydroquinone.

880 parts of crystalline barium hydroxide are added to this solution and the mixture is boiled for a few hours while recovering the ethyl morpholine. 96 parts of potash are added and the slurry is filtered. The clear orange liquor which exhibits a green fluorescence, contains the disulfuric acid ester of 2-amino-3-chloro anthrahydroquinone of the formula:

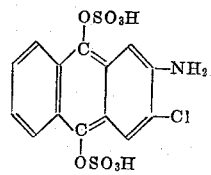

This solution is cooled to 15° C., and treated with 360 parts by volume of 13% sodium hypochlorite liquor (equivalent to 46.8 parts of NaClO). The solution is agitated for several hours at 15° C., and then is clarified, advantageously with the addition of some "Filter-Cel."

The resulting solution, orange colored with green fluorescence, contains the tetrasulfuric ester of 3,3'-dichloro dianthrahydroquinone azine of the formula:

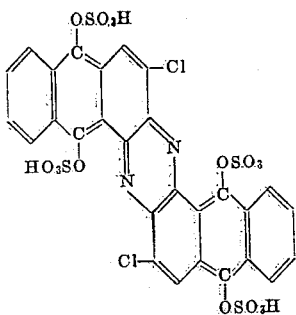

By treatment with acid oxidizing agents, such as sodium nitrite and sulfuric acid, or cupric sulfate and sulfuric acid, the free 3,3'-dichloroindanthrene may be precipitated from this solution in good yield.

The tetrasulfuric ester of the above given formula may be isolated as its potassium salt by adding to the clear solution potassium carbonate in amounts sufficient to bring its concentration to 40% by weight. The desired potassium salt separates as a brown crystalline solid, which is filtered, pressed. The press cake may be used for dyeing textiles after dissolving in water, or it may be dried before use.

*Example 7*

147 parts of anthraquinone 2-oxaminic acid (prepared by fusion of beta amino anthraquinone with hydrated oxalic acid and extraction with hot water; brownish crystals, M. P. 219–221° C., uncorr.) are suspended in a solution of 1500 parts of water and 278 parts of caustic potash (85%). 115 parts of sodium hydrosulfite powder (90%) are added, and the solution is stirred at room temperature until vatting is complete, preferably under exclusion of air.

To the red liquor are added 293 parts of the N-ethyl morpholine-sulfur trioxide addition product, and the mixture is agitated for several hours at room temperature. The solution is clarified, 630 parts of barium hydroxide crystals are added, and the slurry is boiled to hydrolyze the oxaminic acid group. The ethyl morpholine is most conveniently recovered at this stage of the process. The excess of barium is precipitated by addition of 70 parts of potash, the slurry is filtered. The clear filtrate contains the disulfuric ester of beta amino anthrahydroquinone.

For oxidation to the tetrasulfuric ester of the leuco indanthrene, the solution thus obtained is cooled to 15° C., and treated gradually with 200 parts by volume of a 13% sodium hypochlorite solution (corresponding to 26 parts by weight of real sodium hypochlorite). Agitation is continued for a few hours at 15° C., and the solution is clarified.

The clear solution contains the tetrasulfuric ester of dianthrahydroquinone azine. The potassium salt of this ester can be salted out by means of potassium carbonate, as described in Example 1, or the free indanthrene dyestuff may be recovered by hydrolytic oxidation, preferably with acid copper sulfate, as described in Example 2.

In the foregoing examples sulfur trioxide compounds of other strongly basic tertiary amines, e. g. of triethylamine or of cyclohexyl-dimethylamine may be used with good success.

We claim:

1. In the process for preparing indanthrene dyestuffs from beta-aminoanthraquinones by esterification of the leuco anthraquinone to their disulfuric esters and oxidizing in aqueous medium, the improvement which comprises producing the disulfuric ester by reaction on a beta-aminoanthrahydroquinone in aqueous medium with a sulfur trioxide compound of a tertiary amine having a dissociation constant of at least $1 \times 10^{-7}$ at 25° C.

2. In the process for preparing indanthrene dyestuffs from beta-aminoanthraquinones by esterification of the leuco anthraquinones to their disulfuric ester and oxidizing in aqueous medium, the improvement which comprises producing the disulfuric ester by reaction on a beta-acylaminoanthrahydroquinone in aqueous medium with a sulfur trioxide compound of a tertiary amine having a dissociation constant of at least $1 \times 10^{-7}$ at 25° C.

3. A process of preparing indanthrene dyestuffs which comprises reacting a beta-aminoanthrahydroquinone in aqueous medium with a sulfur trioxide compound of a tertiary amine having a dissociation constant greater than $1 \times 10^{-7}$ at 25° C. to produce the disulfuric ester and oxidizing the reaction mixture thus produced without isolation of the ester to the indanthrene dyestuff.

4. A process of preparing indanthrene dyestuffs which comprises reacting a beta-acylaminoanthrahydroquinone in aqueous medium with a sulfur trioxide compound of a tertiary amine having a dissociation constant greater than $1 \times 10^{-7}$ at 25° C. to produce the disulfuric ester and oxidizing the reaction mixture thus produced without isolation of the ester to the indanthrene dyestuff.

5. A process of preparing a sulfuric ester of a leuco indanthrene dyestuff which comprises reacting a beta-aminoanthrahydroquinone in aqueous medium with a sulfur trioxide compound of a tertiary amine having a dissociation constant greater than $1 \times 10^{-7}$ at 25° C. and oxidizing the ester produced in aqueous alkaline medium to the sulfuric ester of the leuco indanthrene dyestuff.

6. A process of preparing a sulfuric ester of a leuco indanthrene dyestuff which comprises reacting a beta-acylaminoanthrahydroquinone in aqueous medium with a sulfur trioxide compound of a tertiary amine having a dissociation constant greater than $1 \times 10^{-7}$ at 25° C. and oxidizing the ester produced in aqueous alkaline medium to the sulfuric ester or the leuco indanthrene dyestuff.

7. A method of producing an indanthrene dyestuff which comprises reacting a beta acylaminoanthrahydroquinone in aqueous medium with a sulfur trioxide compound of a tertiary amine having a dissociation constant greater than $1 \times 10^{-7}$ at 25° C., hydrolyzing the acylamino group and subjecting the hydrolyzed sulfuric ester to oxidation in aqueous acid medium to the indanthrene dyestuff.

8. A process of preparing a sulfuric ester of a leuco indanthrene dyestuff which comprises reacting a beta-acylaminoanthrahydroquinone in aqueous medium with a sulfur trioxide compound of a tertiary amine having a dissociation constant greater than $1 \times 10^{-7}$ at 25° C. hydrolyzing the acylamino group and subjecting the sulfuric ester to oxidation in aqueous alkaline medium to the sulfuric ester of the leuco indanthrene dyestuff.

9. A method according to claim 5 in which oxidation is effected with sodium hypochlorite.

10. A method according to claim 6 in which oxidation is effected with sodium hypochlorite.

11. A method according to claim 8 in which oxidation is effected with sodium hypochlorite.

12. A method according to claim 1 in which the sulfur trioxide compound is the sulfur trioxide compound of N-ethyl morpholine.

13. A method according to claim 3 in which the sulfur trioxide compound is the sulfur trioxide compound of N-ethyl morpholine.

14. A method according to claim 5 in which the sulfur trioxide compound is the sulfur trioxide compound of N-ethyl morpholine.

15. A method according to claim 7 in which the sulfur trioxide compound is the sulfur trioxide compound of N-ethyl morpholine.

16. A method according to claim 8 in which the sulfur trioxide compound is the sulfur trioxide compound of N-ethyl morpholine.

17. A method according to claim 6 in which the beta-arylamino-anthrahydroquinone is a 2 acyl amino 3-chloroanthrahydroquinone.

18. A method according to claim 8 in which the beta-arylamino-anthrahydroquinone is a 2 acylamino-3-chloro-anthrahydroquinone.

HANS Z. LECHER.
MARIO SCALERA.
ELIZABETH M. HARDY.